United States Patent [19]
Dillon et al.

[11] Patent Number: 6,141,403
[45] Date of Patent: Oct. 31, 2000

[54] MODEM PROTOCOL

[75] Inventors: Charles Bruce Dillon, Morrisville; Frank Westbrook Dain, Chapel Hill; Laurence Victor Marks, Raleigh; Sandra Rhodes, Wake Forest, all of N.C.

[73] Assignee: International Business Machines Corporation, Armonk, N.Y.

[21] Appl. No.: 08/910,893

[22] Filed: Aug. 13, 1997

[51] Int. Cl.$^7$ .................................................. H04M 11/00

[52] U.S. Cl. .................................. 379/93.31; 379/93.28; 375/222

[58] Field of Search .............................. 379/93.05, 93.06, 379/93.28, 93.31, 93.32; 375/222, 377

[56] References Cited

U.S. PATENT DOCUMENTS

| | | | |
|---|---|---|---|
| 4,894,847 | 1/1990 | Tjahjadi et al. | 375/121 |
| 4,953,210 | 8/1990 | McGlynn et al. | 380/48 |
| 5,309,562 | 5/1994 | Li | 395/200 |
| 5,353,280 | 10/1994 | Ungerboeck | 370/32.1 |
| 5,384,780 | 1/1995 | Lomp et al. | 370/94.1 |
| 5,418,842 | 5/1995 | Cooper | 379/98 |
| 5,751,441 | 5/1998 | Morimoto | 358/434 |
| 5,793,809 | 9/1998 | Holmquist | 375/222 |
| 5,818,879 | 10/1998 | Eyuboglu et al. | 375/286 |

OTHER PUBLICATIONS

Hardie Christa, US Robotics DEvelop 56Kps Modem Bridge, Electronic News, May 12, 1997.

*Primary Examiner*—Huyen Le
*Assistant Examiner*—Melur Ramakrishnaiah
*Attorney, Agent, or Firm*—Kelly K. Kordzik; Winstead, Sechrest & Minick

[57] ABSTRACT

When two 56K server modems communicate with one another over the public switched telephone network, they signal each other so that they communicate data to each other in a digital pass-through mode whereby essentially there is a direct digital connection between the two modems. This is accomplished by using extended ITU-T Recommendation V.8 protocols.

1 Claim, 9 Drawing Sheets

And here's a typical JM response using this invention:

1 1 1 1 1 1 1 1 1 1    ten ones
0 0 0 0 0 0 1 1 1 1    ten synchronization bits
— stop bit
— (ASCII 224)
— start bit

0 1 0 0 0 0 0 1 1 1    Call function octet (transmit and receive data)
— stop bit
— transmit and receive data
— always 0 indicating category octet
— call function category
— start bit 0 1 0 1 0 0 1 1 0 1    Modulation category
— stop bit
— V.34 half duplex
— V.34 duplex
— Direct digital passthrough data (was Reserverd)
— always 0 indicating category octet
— modulation category
— start bit

0 1 1 0 0 1 0 0 0 1    First modulation extension octet
— stop bit
— V.27ter
— V.29 half duplex
— always 010 indicating extension octet
— V.17
— V.22bis/V.22
— V.32bisV.32
— start bit

0 1 1 0 0 1 0 0 0 1    First modulation extension octet
— stop bit
— V.27ter
— V.29 half duplex
— always 010 indicating extension octet
— V.17
— V.22bis/V.22
— V.32bisV.32
— start bit

| FIG. 7A |
|---------|
| FIG. 7B |

FIG. 7B

MODEM PROTOCOL

TECHNICAL FIELD

The present invention relates in general to the transmission of data, and in particular, to the transmission of digital data through the public switched telephone network.

BACKGROUND INFORMATION 56K modem technology is designed to work in the case where one end (the server) has a digital path directly from the computing device, through digital elements in the telephone network, to the central office nearest the end user. At that point, the digital signal is converted to analog form and placed on the local analog telephone loop The other end (client) is connected to the other end of the local loop with an analog connection. In this instance, the server can send data at a 56,000 bits/second rate because it can apply digital patterns (corresponding to different analog voltages) synchronized to the rate that those patterns are applied to the analog line by the digital-to-analog converter (codec). Depending on the scheme considered, the path from the client to modem may use a similar scheme, or may use a conventional modulation like ITU-T V.34.

The problem occurs when two such server modems attempt to connect to one another. Because they are both digitally coupled to the public switched telephone network ("PSTN"), they should be able to connect at 64,000 bits/second in both directions (or possibly 56,000 bits/second if an archaic telephone system called robbed-bit signalling is in use).

However, this is not accomplished. Instead, the modems first negotiate the highest speed modulation scheme they both support, using a protocol called V.8 (or V.8bis). Since the 56K protocol is asymmetric, both servers will not see a client, so they will drop to V.34 (33,600 bits/second), which is about half the speed that could otherwise be supported.

Therefore, there is a need in the art for an ability for two 56K modems to communicate with each other over the public switched telephone network at 56,000 bits/second, or even 64,000 bits/second.

SUMMARY OF THE INVENTION

The foregoing need is addressed by the present invention, which provides for a direct digital connection over the public switched telephone network to be made between two 56K server modems communicating with one another. In other words, the data is passed through transparently (e.g., 64,000 bits/second). Since there is a possibility that an intermediate link between the two 56K modems uses robbed-bit signalling, the connection may be at 56,000 bits/second, with the least significant bit set to 1 on transmit and ignored in receipt.

The foregoing may be implemented during the initial communications protocol between the two modems whereby signals are passed between the two modems indicating to each other that they are both digitally connected to the public switched telephone network. When both 56K modems have made this determination, then they will enter a mode whereby they transmit and receive digital data in a pass-through mode.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

The protocol of the present invention is implemented under ITU-T Recommendation V.8 for data communication over the telephone network, which is hereby incorporated by reference herein. The present invention extends the ITU-T V.8 protocols in the manner discussed below.

Figure 1:
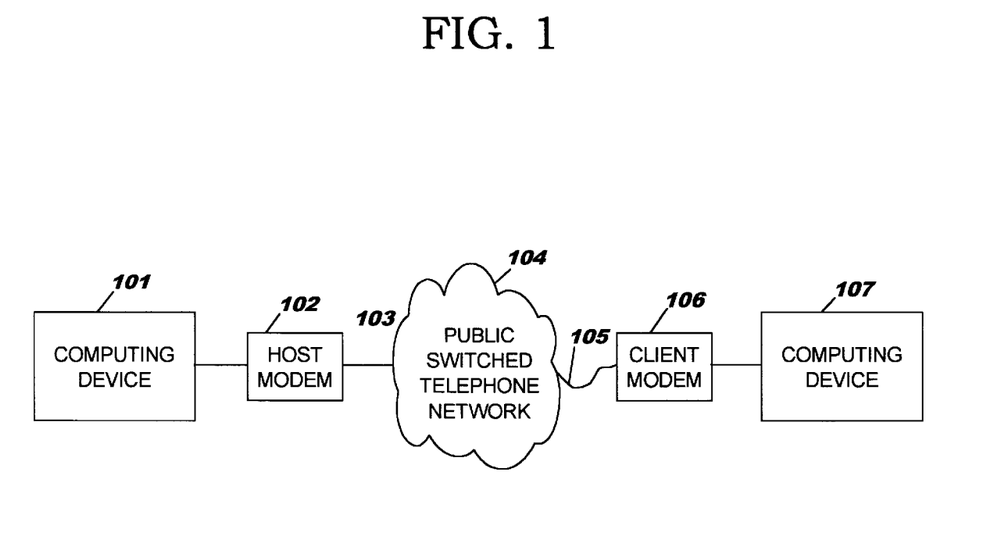
FIG. 1 illustrates a configuration where one of the modems is connected to the public switched telephone network by an analog connection.

FIG. 1 illustrates a server computing device 101 coupled to a server 56K modem 102, which is digitally connected by digital connection 103 to public switched telephone network 104. Various types of digital connections, such as ISDN, T1, ISDN Basic Rate, E1, etc., may be utilized. Client computing device 107 is coupled to client 56K modem 106, which is connected to the public switched network 104 by an analog connection 105. This configuration is typical whereby the server 56K modem 102 can send data at a 56,000 bits/second rate because it can apply digital patterns synchronized to the rate that those patterns are applied to the analog line 105 by a codec (not shown).

Figure 2:
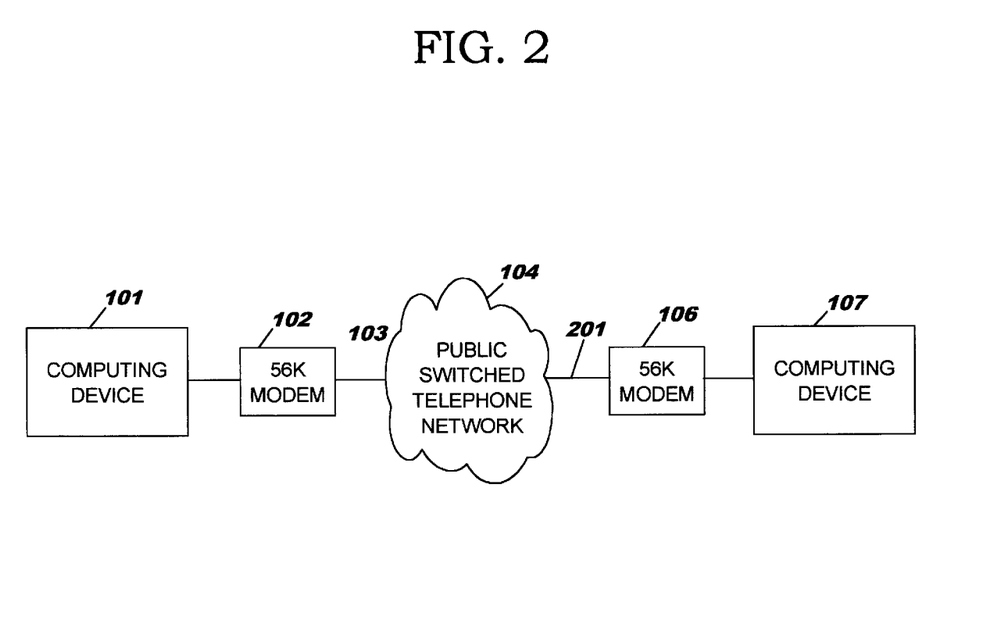
FIG. 2 illustrates a configuration where both of the 56K modems are connected to the public switched telephone network by digital connections.

Referring next to FIG. 2, there is illustrated a similar configuration as that illustrated in FIG. 1, except that 56K modem 106 is connected to the public switched telephone network 104 by a digital connection 201. With this configuration, both of the 56K modems 102 and 106 will not see a client, so therefore they will drop to a V.34 (33,600 bits/second) mode of transmission, which is half the speed they support, when communicating with one another.

Figure 3:
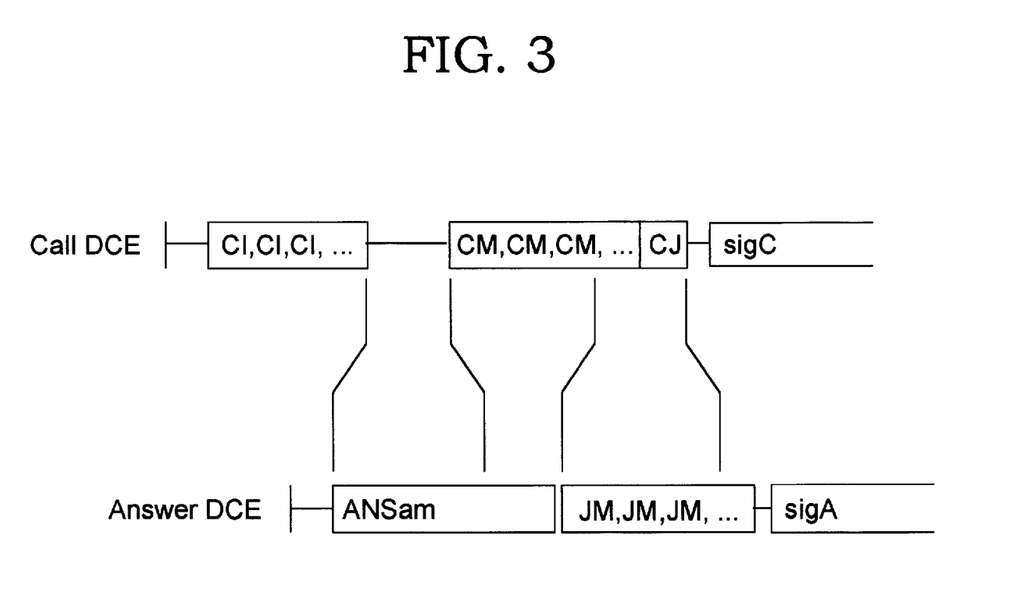
FIG. 3 illustrates the initial exchange of signals between the two modems for setting up the mode with which they will communicate with each other.
Figure 4:
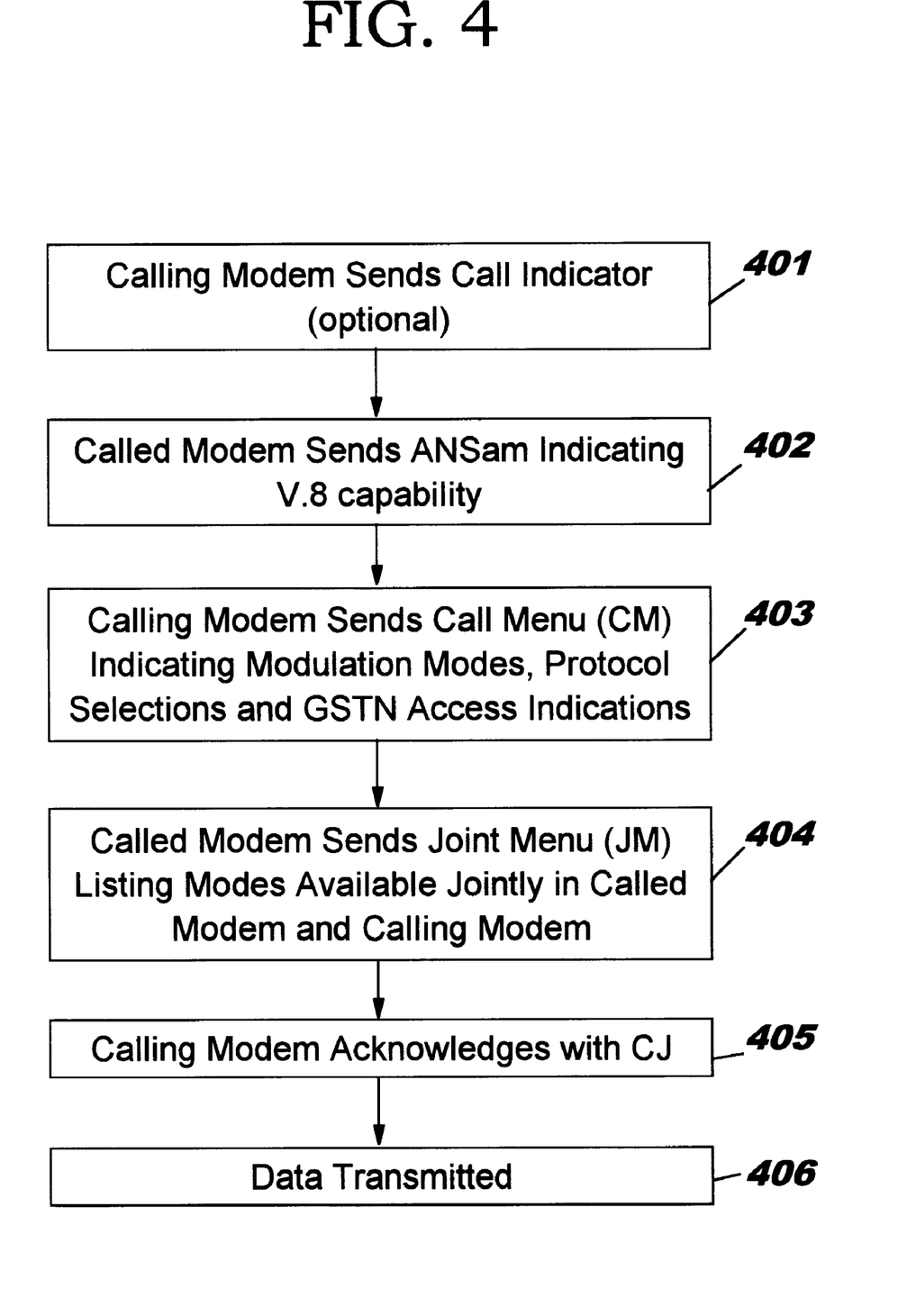
FIG. 4 illustrates a flow diagram in accordance with the present invention.
Figure 5:
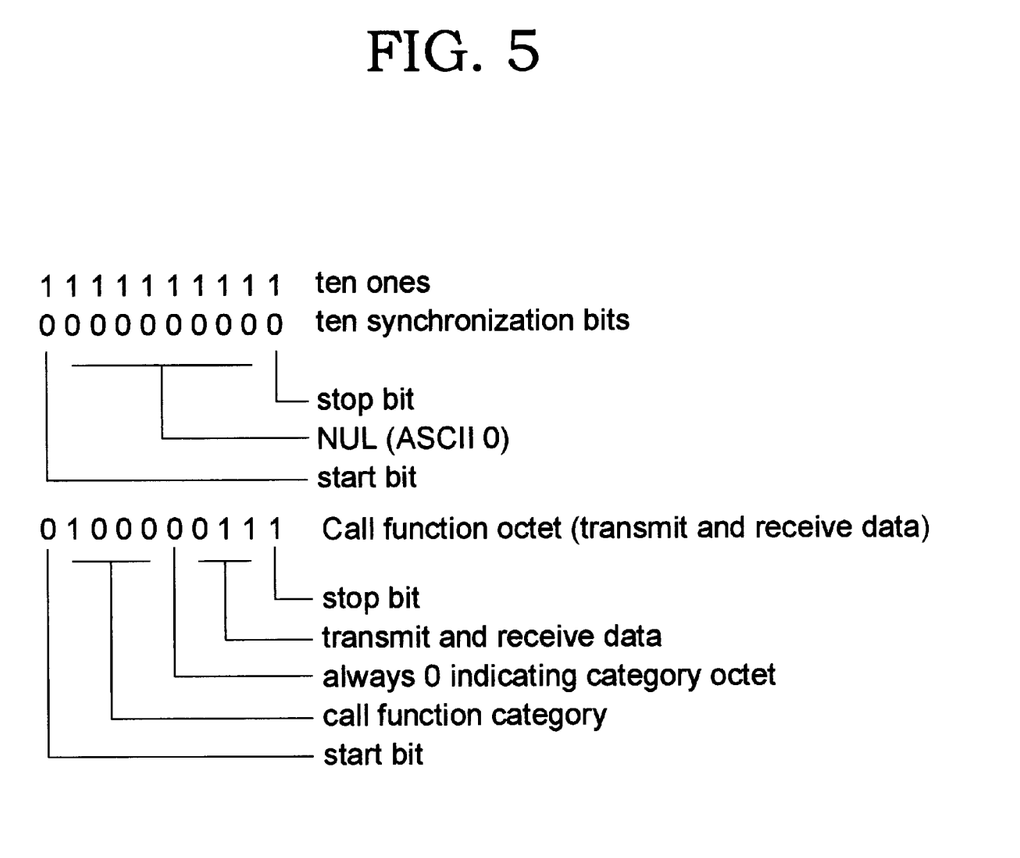
FIG. 5 illustrates an exemplary bit configuration for a call indicator.

The foregoing problem is addressed by the present invention. Referring to FIGS. 3 and 4, there is illustrated one embodiment for implementing the present invention. Essentially, the initial communications protocol under ITU-T V.8 is utilized for beginning a communication session between the two 56K modems 102 and 106. Beginning in step 401, the calling modem 102 (more generally, the data communications equipment (DCE)) will initiate the transmission of a call indicator (CI) (which is optional) or continue transmission of no signal. FIG. 5 illustrates an example of the bits that are transmitted as the call indicator, along with an explanation of the purpose of each of the bits. The bits identified as "transmit and receive data" indicate that the purpose of the call is to transfer data in both directions.

Figure 6A:
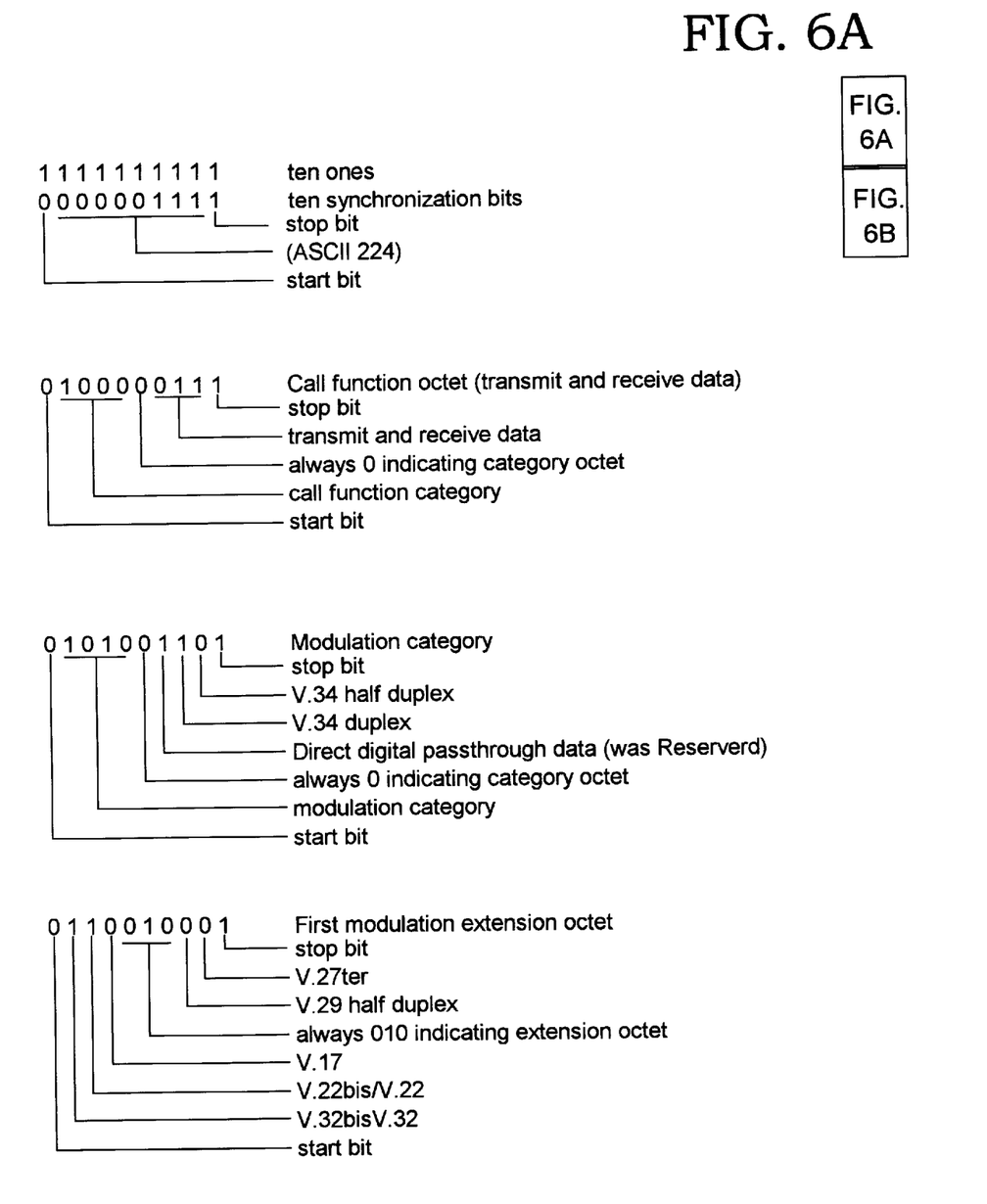
FIG. 6 illustrates an exemplary bit configuration for a call menu in accordance with the present invention.
Figure 6B:
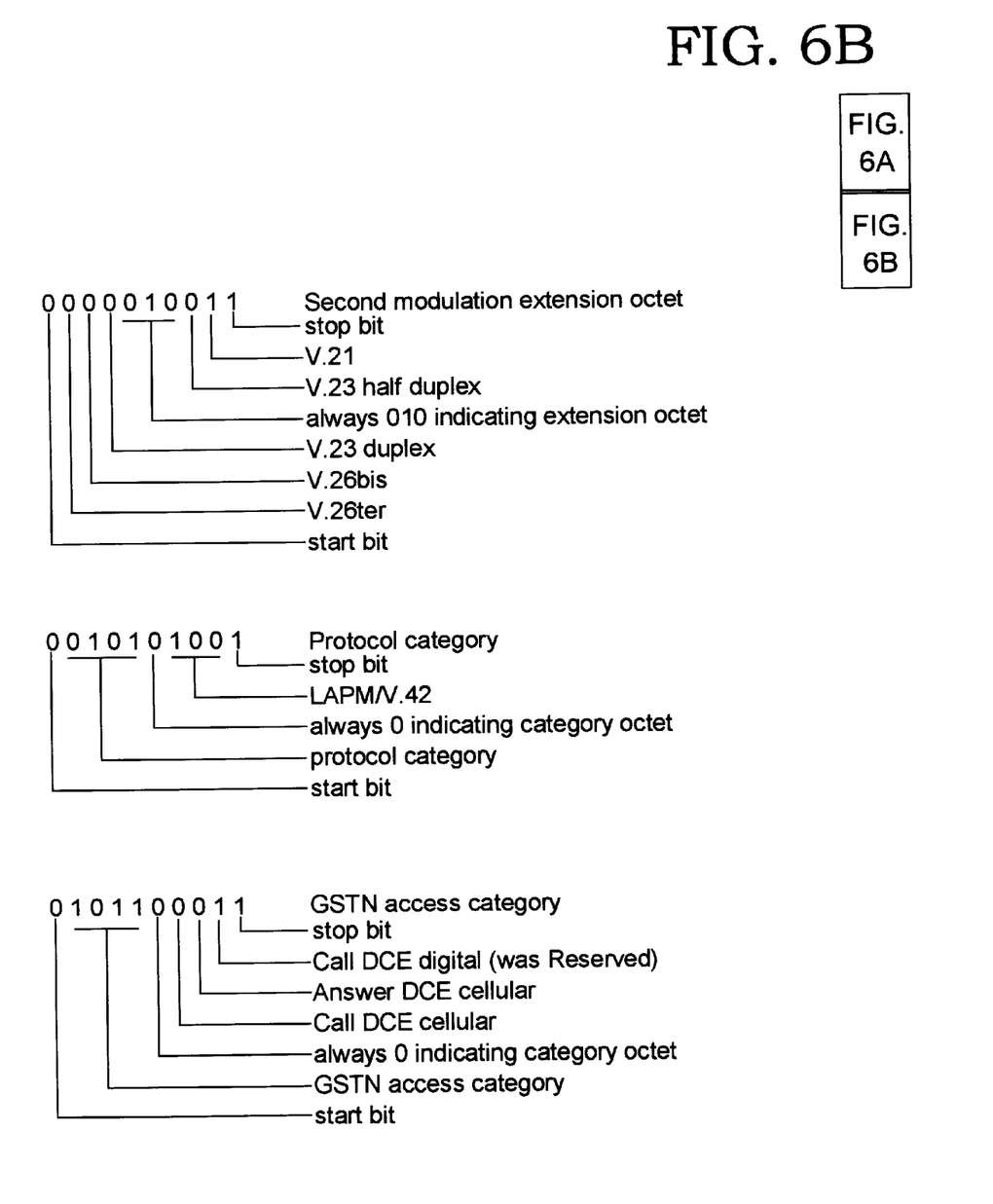

Thereafter, in step 402, the called modem 106 (answer DCE) sends a return signal ANSam indicating the capability to communicate under ITU-T V.8. The ANSam signal may be a typical data modem answer tone which has its amplitude varied to indicate the capability to communicate under ITU-T V.8. Next, in step 403, the calling modem 102 sends a call menu (CM) indicating specified modulation modes, protocol selections, and GSTN (general switched telephone network) access indications. FIG. 6 illustrates an exemplary configuration for the call menu. In the call menu the preamble and call function octet are mandatory under V.8 while the modulation, protocol, and GSTN access categories are optional. Except for the preamble, each of these categories is structured as a byte or series of bytes. The category byte is recognizable because bit 4 is always a 0. Bits 0–3 indicate which category is being defined (e.g., 1000 is the call function, 1010 is the modulation mode, etc.).

Bits 5, 6, and 7 are for parameter exchange.

Table 1 indicates the coding over three octets to indicate availability of various GSTN V-Series modulation modes. Table 1 corresponds to the modulation category and the first and second modulation extension octets illustrated in FIG. 6.

TABLE 1

| Start | b0 | b1 | b2 | b3 | b4 | b5 | b6 | b7 | Stop | Octet - 'modn0' |
|---|---|---|---|---|---|---|---|---|---|---|
| 0 | 1 | 0 | 1 | 0 | | | | | | Tag b0–b3 indicating the modulation modes category |
| | | | | | 0 | | | | | Indicates a category octet |
| | | | | | | 1 | | | | Direct digital passthrough data |
| | | | | | | | x | | | 1 denotes V.34 duplex availability |
| | | | | | | | | x | | 1 denotes V.34 half-duplex availability |
| | | | | | | | | | 1 | Stop bit |
| 0 | | | | | | | | | | Octet - 'modn1' |
| | x | | | | | | | | | 1 denotes V.32 bis/V.32 availability |
| | | x | | | | | | | | 1 denotes V.22 bis/V.22 availability |
| | | | x | | | | | | | 1 denotes V.17 availability |
| | | | | 0 | 1 | 0 | | | | Indicates an extension octet |
| | | | | | | | x | | | 1 denotes V.29 half-duplex availability (as used in T.30, etc.) |
| | | | | | | | | x | | 1 denotes V.27 ter availability |
| | | | | | | | | | 1 | Stop bit |
| 0 | | | | | | | | | | Octet - 'modn2' |
| | x | | | | | | | | | 1 denotes V.26 ter availability |
| | | x | | | | | | | | 1 denotes V.26 bis availability |
| | | | x | | | | | | | 1 denotes V.23 duplex availability |
| | | | | 0 | 1 | 0 | | | | Indicates an extension octet |
| | | | | | | | x | | | 1 denotes V.23 half-duplex availability |
| | | | | | | | | x | | 1 denotes V.21 availability |
| | | | | | | | | | 1 | Stop bit |

Within the modulation modes, one of the bits reserved for future definition by the ITU-T, such as bit b5, may be utilized by the present invention to indicate a capability of the modem to transmit in a digital pass-through mode. As an example, bit b5 of the category octet is set to a 1 would then indicate to the called modem 106 that the calling modem 102 has a capability to transmit and receive data in a digital pass-through mode. This is consistent with the definition for V.8 whereby modems have multiple modes in common in that the modems should use the lowest numbered item (available mode).

As an alternative, an extension octet may be added to those listed in Table 1 for providing this indication. As may be easily seen by viewing Table 1, in an extension octet, bits b3–b5 are [0,1,0]. Other bits, such as bits b0 and b1 may be utilized to provide the digital pass-through indication.

In addition to indicating that both modems are 56K capable, there is also an indication from each modem to the far end that the communicating end is digitally attached to the telephone line (connections 103 and 201 in FIG. 2). Table 2 provides codes for indicating cellular access to the GSTN connection. Also included in Table 2 is an assignment of a formerly reserved bit and an extension octet for indicating digital access (connections 103 and 201) for both the calling and called modems 102 and 106, respectively. These may be implemented by asserting b7 in the category octet and b0 in the extension octet.

For the purposes of the present invention, the joint menu indicates that the answer (and call) DCEs have 56K capability, and that both are digitally connected. Next, in step 405, the calling modem 402 then acknowledges with a CJ signal. The CJ signal is a 3-byte signal sent by the call DCE to acknowledge receipt of the joint menu. The CJ signal is implemented within V.8. Next, in step 406, data is transmitted between modems 102 and 106 in a digital pass-through mode.

The sigC and sigA signals are typical modem signals transmitted by the call and answer DCEs respectfully. For the purposes of this invention, these signals are direct digital data.

In the present invention, digital pass-through mode means that the digital data is transmitted directly without modulation. Furthermore, encoding/escape sequences for cases where the line quality is insufficient to sustain 128 unique code points is not needed, and encoding/escape sequences to transmit certain forbidden sequences (corresponding to analog values with excessive amplitude) as multiple characters is not required. Scrambling to remove sensitivity to certain data sequences is not required, but may be used. Essentially, with a digital pass-through mode, the data is placed directly on the transmission line.

As indicated above, when the data is transmitted in step 406, it may be transmitted at 64,000 bits per second or 56,000 bits per second. Each modem 102 and 106 can be

TABLE 2

| Start | b0 | b1 | b2 | b3 | b4 | b5 | b6 | b7 | Stop | Octet - 'access0' |
|---|---|---|---|---|---|---|---|---|---|---|
| 0 | 1 | 0 | 1 | 1 | | | | | | Tag b0–b3 indicates the GSTN access category |
| | | | | | 0 | | | | | Indicates a category octet |
| | | | | | | x | | | | 1 denotes that the call DCE is on a cellular connection |
| | | | | | | | x | | | 1 denotes that the answer DCE is on a cellular connection |
| | | | | | | | | 1 | | Call DCE has digital connection |
| | | | | | | | | | 1 | Stop bit |
| 0 | | | | | | | | | | Octet - 'access2' |
| | 1 | | | | | | | | | Answer DCE has digital connection |
| | | x | | | | | | | | Reserved |
| | | | x | | | | | | | Reserved |
| | | | | 0 | 1 | 0 | | | | Extension octet |
| | | | | | | | x | | | Reserved |
| | | | | | | | | x | | Reserved |
| | | | | | | | | | 1 | Stop bit |

Figure 7A:
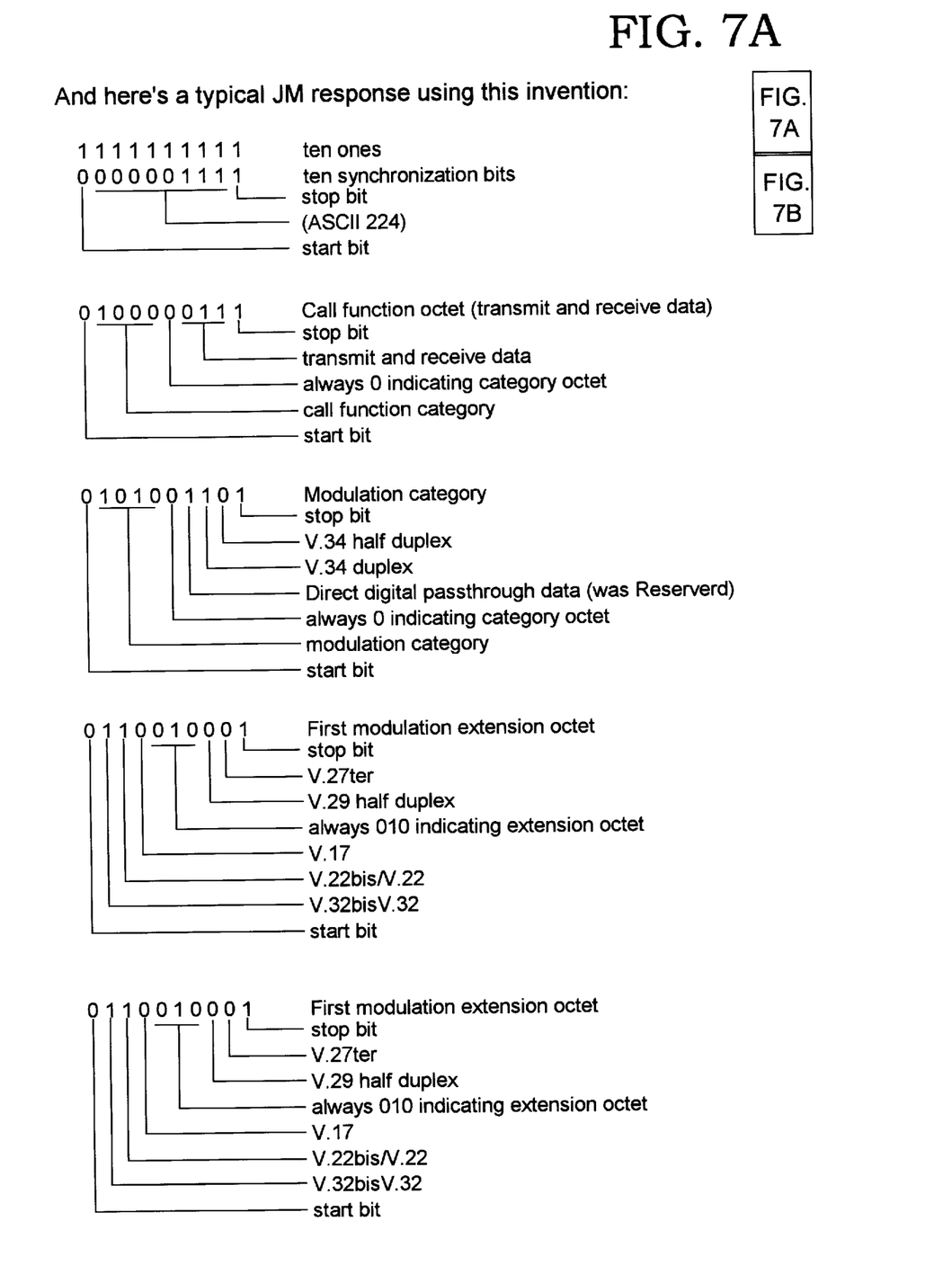
FIG. 7 illustrates an exemplary bit configuration for a joint menu in accordance with the present invention.
Figure 7B:
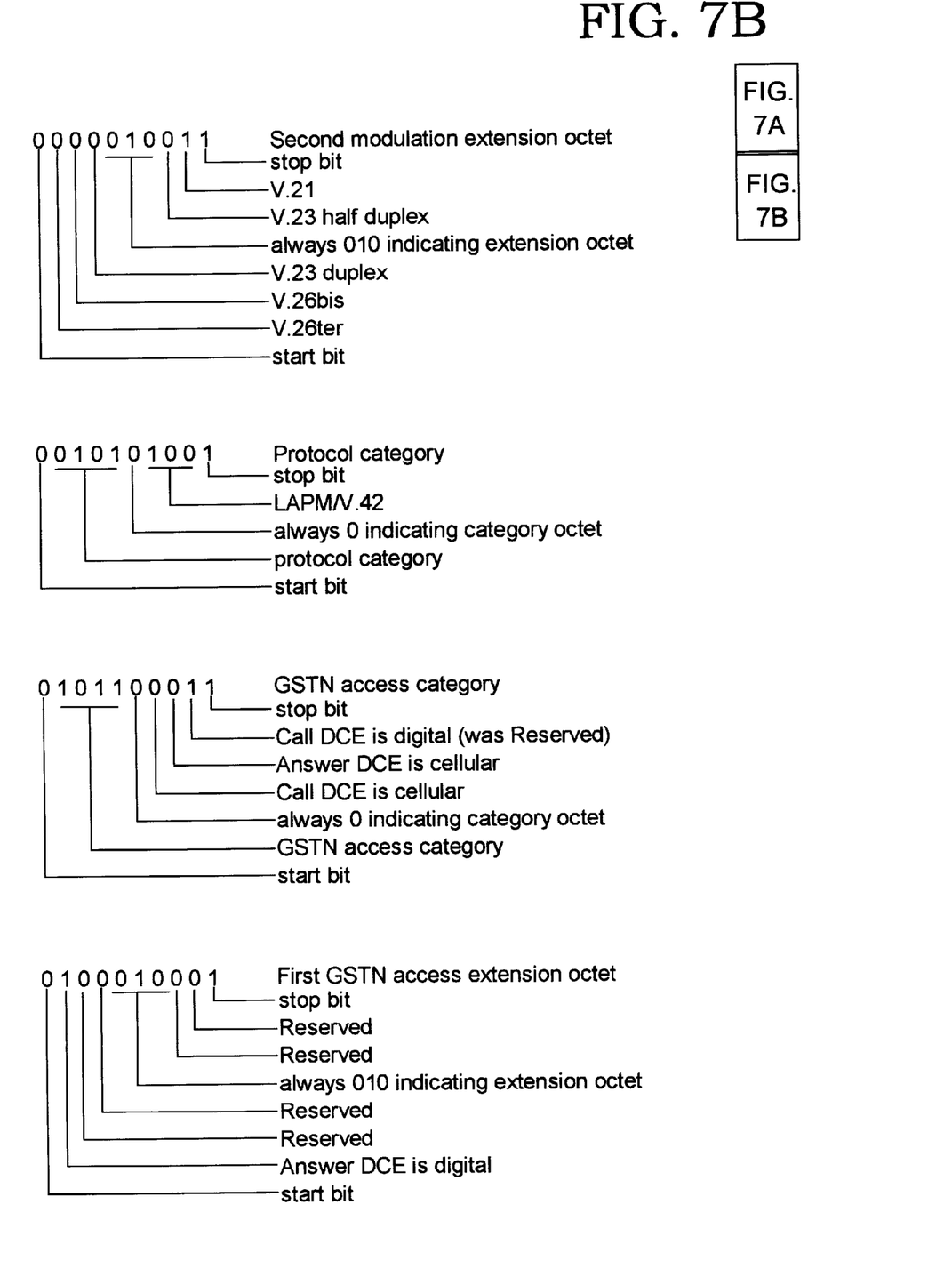

Thereafter, in step 404, the called modem 106 sends a joint menu (JM) listing the modes available jointly in the called modem and the calling modem. FIG. 7 illustrates an exemplary joint menu, which would correspond to the call menu illustrated in FIG. 6. The joint menu is a series of bytes just like the call menu with the difference being that the joint menu indicates all the parameters that are in common between the call and answer DCEs. The call menu and the joint menu implement the negotiation between modems 102 and 106.

The call and answer DCEs 102 and 106 use the modulation mode with the lowest common item number.

configured to indicate whether its local link (103 and 201, respectively) is capable at 56K or 64K. This can be indicated by bits in an extension octet to the GSTN access category.

Although the present invention and its advantages have been described in detail, it should be understood that various changes, substitutions and alterations can be made herein without departing from the spirit and scope of the invention as defined by the appended claims.

What is claimed is:

1. A method for communicating data in a digital pass-through mode over a public switched telephone network ("PSTN") between first and second 56K modems, the method comprises the steps of:

sending a call menu from the first modem to the second modem, wherein the call menu includes (1) a modulation category including an indication that the first modem is capable of transmission of data in the digital pass-through mode, and (2) a GSTN category including an indication that the first modem is digitally connected to the PSTN;

returning a joint menu from the second modem to the first modem, wherein the joint menu includes (1) a modulation category including an indication that the second modem is capable of transmission of data in the digital pass-through mode, and (2) a GSTN category including an indication that the second modem is digitally connected to the PSTN; and transmitting data between the first and second modems in the digital pass-through mode.

* * * * *